United States Patent Office 2,823,203
Patented Feb. 11, 1958

2,823,203
METHOD OF PRODUCING SUBSTANTIALLY PURE ERYTHROMYCIN A

Robert K. Clark, Jr., Waukegan, Ill., assignor to Abbott Laboratories, North Chicago, Ill., a corporation of Illinois No Drawing. Application June 24, 1954
Serial No. 439,166

4 Claims. (Cl. 260—210)

The present invention relates to a method of producing an antibiotic and more particularly to a method of producing pure erythromycin A substantially free of other erythromycin antibiotic products.

Erythromycin is an antibiotic obtained by culturing a strain of Streptomyces erythreus in a culture medium containing an assimilable amount of carbohydrates, nitrogen, and inorganic salts, and recovering the erythromycin antibiotic from the culture medium. It has been found that the erythromycin antibiotic produced by the organism Streptomyces erythreus in a deep culture fermentation process may comprise a mixture of several closely related antibiotic materials which have been identified as erythromycin A and erythromycin B. The presence of one or more of the foregoing erythromycin type antibiotics is readily determined by well-known paper strip chromotography techniques.

Erythromycin A, which was originally thought to comprise the only erythromycin antibiotic produced by the deep culture fermentation of Streptomyces erythreus, possesses antibiotic activity against many organisms, both gram positive and gram negative. Erythromycin A is distinguishable from erythromycin B, however, by having a higher degree of activity against susceptible microorganisms. The antibiotic properties of erythromycin A together with its low toxicity make erythromycin A of great utility as a therapeutic agent in the treatment of many diseases.

It is, therefore, an object of the present invention to provide an improved method of producing erythromycin A substantially uncontaminated with other erythromycin antibiotic products.

It is a further object of the invention to provide an improved method of recovering erythromycin A from an erythromycin mixture containing erythromycin A, erythromycin B, and other erythromycin antibiotic products.

Other objects of the invention will be apparent from the detailed description and claims to follow.

It has been discovered that erythromycin A can be substantially completely separated from other erythromycin fermentation products normally produced by the conventional deep culture fermentation of an erythromycin producing strain of Streptomyces erythreus in a culture medium containing an assimilable source of carbohydrates, nitrogen, and inorganic salts, and particularly erythromycin B which is normally co-present with the erythromycin A in the fermentation products by recrystallizing the products of the above-mentioned fermentation process from a solvent comprising a substantial amount of nitromethane. Thus, by recrystallizing erythromycin produced by the conventional erythromycin fermentation process from a solution thereof in distilled nitromethane, it has been found that the crystalline product obtained in the said recrystallization process comprises essentially erythromycin A and substantially no erythromycin B, or other erythromycin products. The optimum results are obtained by using approximately 7 to 10 ml. of nitromethane per gram of erythromycin as the solvent medium. The use of more concentrated solutions also accomplish excellent purification but care must be taken to thoroughly wash the crystals with nitromethane to remove all traces of the mother liquors therefrom. By concentrating the mother liquors thus obtained to approximately one-tenth the original volume, it is possible to obtain a second crop of erythromycin A crystals of only slightly less purity than the original crop of crystals.

The following specific examples illustrate the preferred form of the present invention and should not be construed to restrict or limit the invention to the precise proportions disclosed.

Example I

An erythromycin product (10 g.) having a bio-assay of 906 u./ml. and an optical rotation of $-76.5°$ and which is known to contain 15% erythromycin B is dissolved in 70 ml. of distilled nitromethane. One gram of activated charcoal is added to the warmed solution (70° C.) and after stirring the solution for about 2 minutes the mixture is filtered. The filtrate is cooled and the crystals dried. The crystalline product (7.5 g) is recrystallized from 70 ml. of distilled nitromethane to yield crystals of substantially pure erythromycin A having a bio-assay potency of 949 u./ml. and a potency of 972 u./ml. as determined by infrared assay.

Example II

To 100 g. of erythromycin base containing approximately 85% erythromycin A base and 15% erythromycin B base is added one liter of distilled nitromethane and 10 g. of activated charcoal. The mixture is warmed to a temperature of about 65–70° C., stirred for approximately two minutes and filtered while warm. The filtrate is then cooled to about 10° C. and after standing for between about 5 to 10 hours the crystals are recovered. The recovered crystals are thereafter recrystallized from one liter of nitromethane in the above manner and the recovered crystals washed with approximately 100 ml. of cold nitromethane, and dried. The crystals are found to be substantially pure erythromycin A having a potency of 1,005 units per ml. as determined by infrared assay and an optical rotation $(\alpha)$ $-77.9°$.

As certain pharmaceutical forms of erythromycin A require particularly high color standards, it is sometimes considered desirable to further treat the pure erythromycin A product of the foregoing examples with a water-acetone solution (1:1 volume) and recrystallizing therefrom a substantially colorless erythromycin A having a potency of 1000 units per ml. as determined by infrared assay and an optical rotation of $(\alpha)$ $-77.1°$.

The present invention makes it possible to obtain substantial yields of pure erythromycin A substantially uncontaminated with erythromycin B base or other erythromycin antibiotic products.

Others may readily adapt the invention for use under various conditions of service, by employing one or more of the novel features disclosed or equivalents thereof. As at present advised with respect to the apparent scope of my invention, I desire to claim the following subject matter.

I claim:

1. A method of obtaining substantially pure erythromycin A normally contaminated by erythromycin B products which comprises dissolving erythromycin A contaminated with erythromycin B in a solvent medium comprised essentially of nitromethane, and recovering therefrom by crystallizing substantially pure erythromycin A substantially uncontaminated by erythromycin B.

2. A method of obtaining substantially pure erythromycin A base normally contaminated by erythromycin B base which comprises forming a solution of erythromycin A base contaminated with erythromycin B base in a solvent medium comprised essentially of nitromethane, and recovering therefrom crystalline erythromycin A base uncontaminated with erythromycin B base.

3. A method of obtaining substantially pure erythromycin A base normally contaminated by erythromycin B base substantially as described in claim 2 wherein the said solvent medium contains approximately 7 to 10 ml. of distilled nitromethane per gram of erythromycin in said solution.

4. A method of obtaining substantially pure erythromycin A base normally contaminated by erythromycin B base which comprises forming a solution of an erythromycin product containing a major proportion of erythromycin A base and a minor proportion of erythromycin B base in distilled nitromethane by heating to a temperature not substantially in excess of 70° C., allowing the said solution to stand for between about 5 to 10 hours at 10° C. to crystallize erythromycin A base from the said solution, recrystallizing the crystallized erythromycin A base from cold distilled nitromethane, and recovering by crystallizing substantially pure crystalline erythromycin A base uncontaminated with erythromycin B base.

References Cited in the file of this patent
UNITED STATES PATENTS

| | | |
|---|---|---|
| 2,653,899 | Bunch et al. | Sept. 29, 1953 |
| 2,671,806 | Winterbottom et al. | Mar. 9, 1954 |

OTHER REFERENCES

Flynn et al.: J. A. C. S., June 20, 1954, pages 3121–3131.